(12) United States Patent
Walker

(10) Patent No.: US 10,562,631 B2
(45) Date of Patent: Feb. 18, 2020

(54) SYSTEMS AND METHODS FOR WIRELESSLY TRANSMITTING ELECTRICAL SIGNALS TO AN OVERHEAD STOWAGE BIN ASSEMBLY OF A VEHICLE

(71) Applicant: THE BOEING COMPANY, Chicago, IL (US)

(72) Inventor: Charles Matthew Walker, Everett, WA (US)

(73) Assignee: The Boeing Company, Chicago, IL (US)

( * ) Notice: Subject to any disclaimer, the term of this patent is extended or adjusted under 35 U.S.C. 154(b) by 698 days.

(21) Appl. No.: 15/281,263

(22) Filed: Sep. 30, 2016

(65) Prior Publication Data

US 2018/0093772 A1   Apr. 5, 2018

(51) Int. Cl.
*B64C 11/00* (2006.01)
*B64D 11/00* (2006.01)
*H02J 50/10* (2016.01)
*H04B 5/00* (2006.01)
*H02J 13/00* (2006.01)

(52) U.S. Cl.
CPC ........... *B64D 11/003* (2013.01); *H02J 50/10* (2016.02); *H04B 5/0031* (2013.01); *H04B 5/0037* (2013.01); *H04B 5/0081* (2013.01); *H02J 13/0075* (2013.01)

(58) Field of Classification Search
CPC .................................................. B64D 11/003
See application file for complete search history.

(56) References Cited

U.S. PATENT DOCUMENTS

| | | | |
|---|---|---|---|
| 2013/0285442 A1* | 10/2013 | Bauer | H04B 5/0037 307/9.1 |
| 2013/0285603 A1* | 10/2013 | Zeinstra | H02J 7/0004 320/108 |
| 2017/0101187 A1* | 4/2017 | Noske | H02J 5/005 |

* cited by examiner

*Primary Examiner* — Daniel J Cavallari
(74) *Attorney, Agent, or Firm* — Joseph M. Butscher; The Small Patent Law Group, LLC

(57) ABSTRACT

A vehicle includes an internal cabin, and a system for wirelessly transmitting electrical signals between a first component and a second component within the internal cabin. The system includes a first circuit including a first coil secured to the first component. The first coil is electrically connected to one or both of a power source or a data source onboard the vehicle. A second circuit includes a second coil secured to the second component. The second coil is electrically connected to an electrical device secured to the second component. The first circuit is separated from the second circuit by a gap. The first coil is configured to receive one or more electrical signals from the power source and/or the data source. The electrical signals are induced in the second circuit by the first circuit and transmitted to the electrical device.

20 Claims, 8 Drawing Sheets

SYSTEMS AND METHODS FOR WIRELESSLY TRANSMITTING ELECTRICAL SIGNALS TO AN OVERHEAD STOWAGE BIN ASSEMBLY OF A VEHICLE

FIELD OF EMBODIMENTS OF THE DISCLOSURE

Embodiments of the present disclosure generally relate to stowage bin assemblies within vehicles, and, more particularly, to systems and methods for wirelessly transmitting electrical signals to an overhead stowage bin assembly within a vehicle.

BACKGROUND OF THE DISCLOSURE

Commercial aircraft typically include an interior cabin that may be divided into numerous sections. A cockpit is generally separated from a passenger cabin, which may include a first class section, a business class section, and a coach section. The passenger cabin may also include one or more work areas for flight personnel, such as galleys, which may include food and beverage storage structures. One or more aisles pass through the passenger cabin and connect each of the passenger sections to one or more paths to one or more doors of the aircraft.

Overhead stowage bins are typically positioned above rows of seats within a commercial aircraft. Each overhead stowage bin is configured to be moved between an open position and a closed position. In the open position, passengers may place carry-on luggage within a moveable bin or bucket. Before the aircraft leaves a terminal, flight attendants ensure that each stowage bin is securely closed.

Stowage bins are being developed in which electrical components may be mounted thereon. For example, an electric latch or lock may be mounted to a bucket of an overhead stowage bin. In order to supply power to the electric latch or lock, standard electrical connectors are typically used. For example, a standard plug and receptacle style connector may be used to electrically connect an electric lock on a moveable bucket to a fixed strongback.

However, space between a strongback and a bucket may not be large enough to accommodate such electrical connectors. Further, during an assembly process, the process of securing the separable portions of an electrical connector to a stowage bin may provide difficult and awkward. Indeed, certain electrical connectors may be very difficult to mount to certain moving parts of a stowage bin. Further, wiring between a fixed strongback and a moveable bucket may be susceptible to being pinched and damaged as the bucket is moved with respect to the strongback.

SUMMARY OF THE DISCLOSURE

A need exists for an efficient system and method for transferring electrical signals between a strongback and a moveable bucket of an overhead stowage bin assembly. A need exists for a compact and effective system and method for electrically coupling components of an overhead stowage bin assembly together.

With those needs in mind, certain embodiments of the present disclosure provide a vehicle that includes an internal cabin, and a system for wirelessly transmitting electrical signals between a first component and a second component within the internal cabin. The system includes a first circuit including a first coil secured to the first component. The first coil is electrically connected to one or both of a power source or a data source onboard the vehicle. A second circuit including a second coil is secured to the second component. The second coil is electrically connected to an electrical device (such as one or more of an electric latch, an electric lock, a speaker, a lighting assembly, monitor, a fan, or the like) secured to the second component. The first circuit is separated from the second circuit by a gap. The first coil is configured to receive one or more electrical signals from the power source and/or the data source. The electrical signal(s) are induced in the second coil by the first coil and transmitted to the electrical device.

In at least one embodiment, the first component includes a strongback of an overhead stowage bin assembly, and the second component includes a bucket that is pivotally coupled to the strongback. The bucket may be pivotally coupled to the strongback at a pivot interface. The first and second coils may be positioned around a circumference of at least a portion of the pivot interface. In at least one embodiment, the pivot interface pivotally couples a fixed panel of the strongback to an end panel of the bucket.

The power source generates a first electrical signal as a power signal that is configured to provide power to the electrical device. The data source outputs a second electrical signal as a data signal that is configured to control at least one aspect of the electrical device.

The first circuit may include one or more first leads that electrically connect the first coil to one or both of the power source or the data source. The second circuit may include one or more second leads that electrically connect the second coil to the electrical device.

In at least one embodiment, the first coil mirrors the second coil. The first coil may be coaxial with the second coil. In at least one embodiment, the first coil is embedded within the first component, and the second coil is embedded within the second component.

Certain embodiments of the present disclosure provide a method of wirelessly transmitting electrical signals between a first component and a second component within an internal cabin of a vehicle. The method includes securing a first coil of a first circuit to the first component, electrically connecting the first coil to one or both of a power source or a data source onboard the vehicle, securing a second coil of a second circuit to the second component, electrically connecting the second coil to an electrical device secured to the second component, connecting the first component to the second component (in which the connecting includes separating the first circuit from the second circuit by a gap), generating one or more electrical signals with one or both of the power source or the data source, receiving the electrical signal(s) generated by the power source and/or the data source at the first coil, inducing the electrical signal(s) in the second coil due to the receiving, and transmitting the electrical signal(s) induced in the second coil to the electrical device.

DETAILED DESCRIPTION OF THE DISCLOSURE

Figure 1:
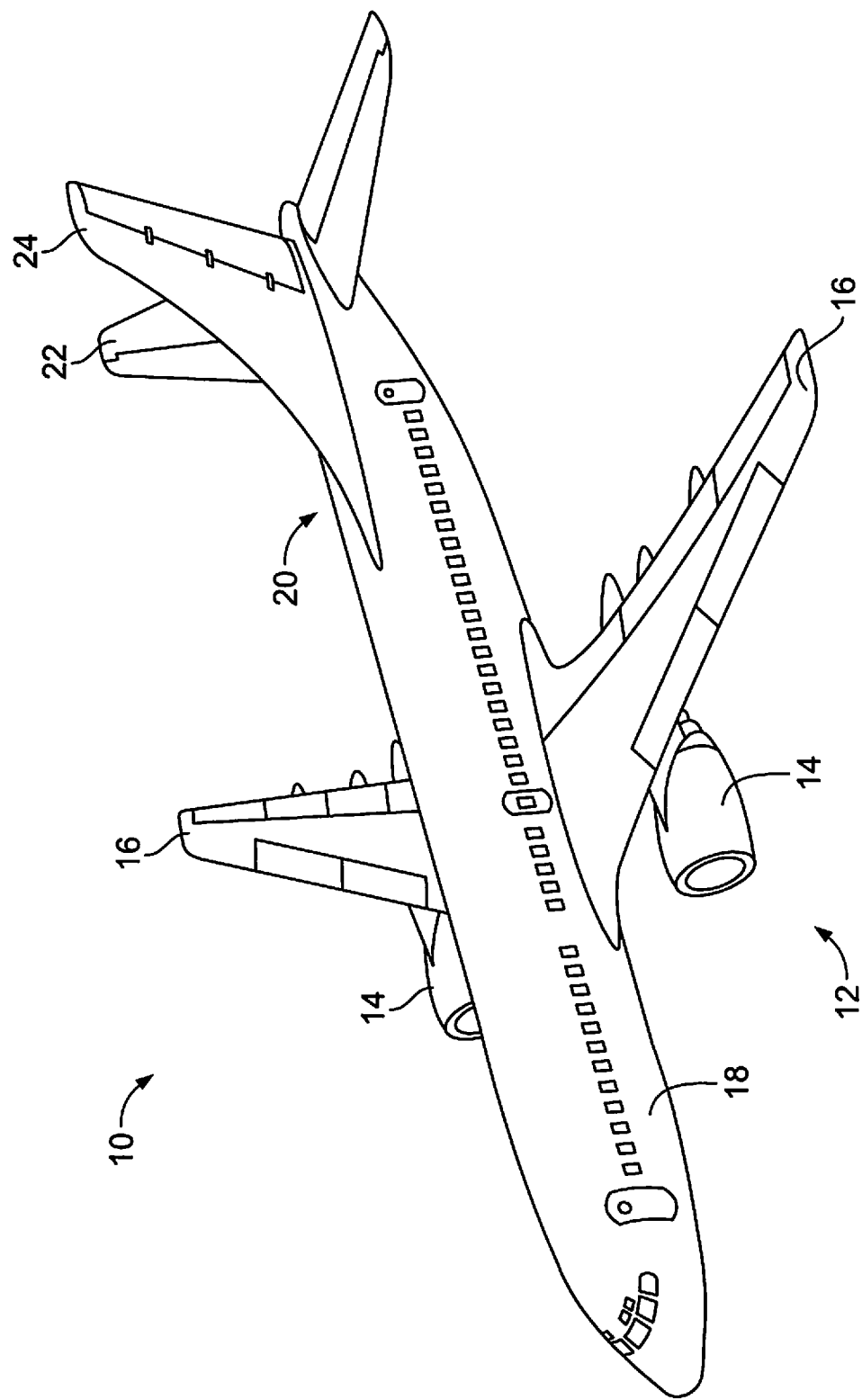
FIG. 1 is a diagrammatic representation of a top perspective view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a system and method for transferring electrical signals (such as power and data signals) between first and second components, such as a strongback and a bucket of an overhead stowage bin assembly within a vehicle. Embodiments of the present disclosure are configured to effectively and efficiently electrically couple the two components together, and are particularly well-suited for assemblies in which the components are within confined spaces in which standard electrical connectors are difficult, if not impossible, to be positioned. Embodiments of the present disclosure provide systems and methods for electrically coupling two components together that replace standard wired connectors that would otherwise be difficult, if not impossible, to be positioned, and awkward to install.

Embodiments of the present disclosure provide electrical coupling systems and methods that replace standard plug and receptacle connectors and/or wired connections. The systems may include first and second circuits that may be mounted on and/or embedded within first and second components, such as panels of a strongback and bucket of an overhead stowage bin assembly.

Certain embodiments of the present disclosure provide systems and methods that are configured to replace electrical and data connectors with more flexible wireless couplings. The systems and methods are configured to transmit electrical signals through coils located in an overhead stowage bin assembly, for example. An inductive distance between the coils may be varied through a change in voltage, current, electronic components (resistors, capacitors, and the like) in the circuit, and/or by changing the characteristics of the coils (wire gage, number of windings, coil size, shape, material, and/or the like).

A first coil may be mounted on a first component, such as a fixed strongback, while a second coil may be mounted on a second component, such as a pivot bin or bucket that is pivotally mounted to the strongback. The first coil is coupled to a power source, such as a main source of electrical power within an aircraft, one or more batteries, and/or the like. The second coil is coupled to an electrical device that is mounted on or within the second component. The electrical device may be an electronic lock, a speaker, a lighting assembly, a display (such as a digital display or monitor), and/or the like. Electrical signals are transferred between the first and second coils. The electrical signals may be power signals or data signals. The power signals are used to provide power to the electrical device. The data signals may be transmitted via radio frequency, WiFi, or the like, and may include lock status and control data for latches, light control data (color, on/off, brightness), specific bin number, video/sound data, and/or the like.

FIG. 1 is a diagrammatic representation of a top perspective view of a vehicle, such as an aircraft 10 (or aircraft assembly), according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class divider assemblies. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

Figure 2A:
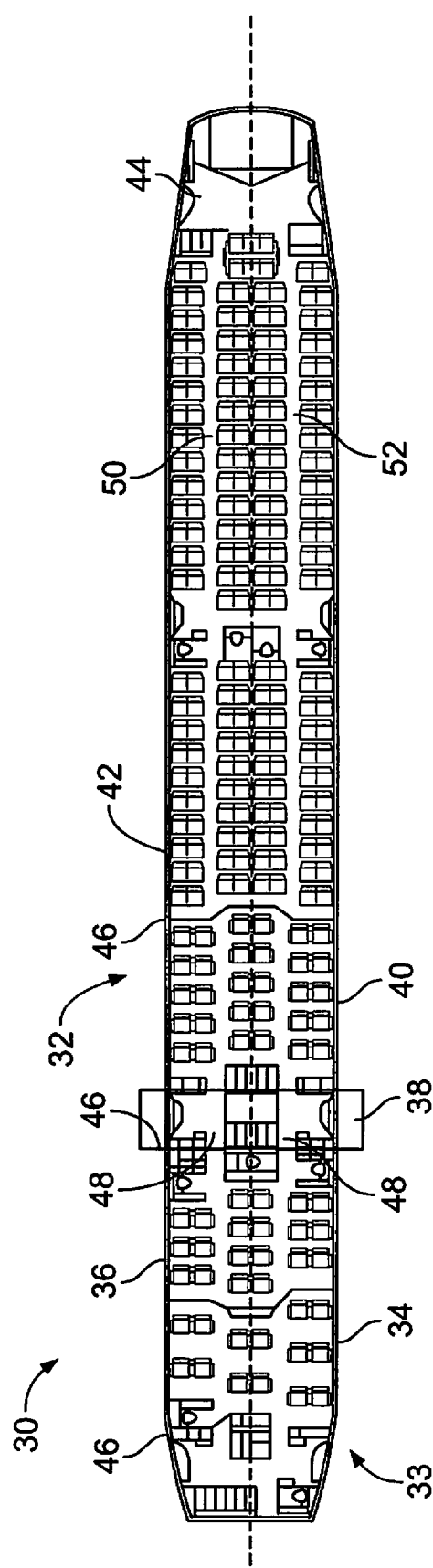
FIG. 2A is a diagrammatic representation of a top plan view of an internal cabin of an aircraft, according to an embodiment of the present disclosure.

FIG. 2A is a diagrammatic representation of a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Figure 2B:
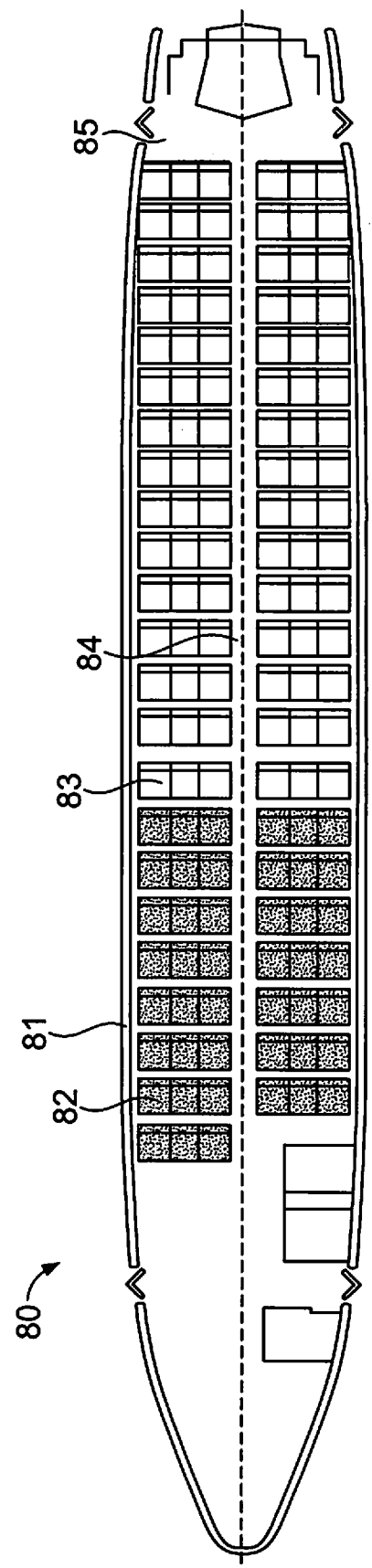
FIG. 2B is a diagrammatic representation of a top plan view of an internal cabin of an aircraft, according to an embodiment of the present disclosure.

FIG. 2B is a diagrammatic representation of a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane 86 of the internal cabin 80.

Figure 3:
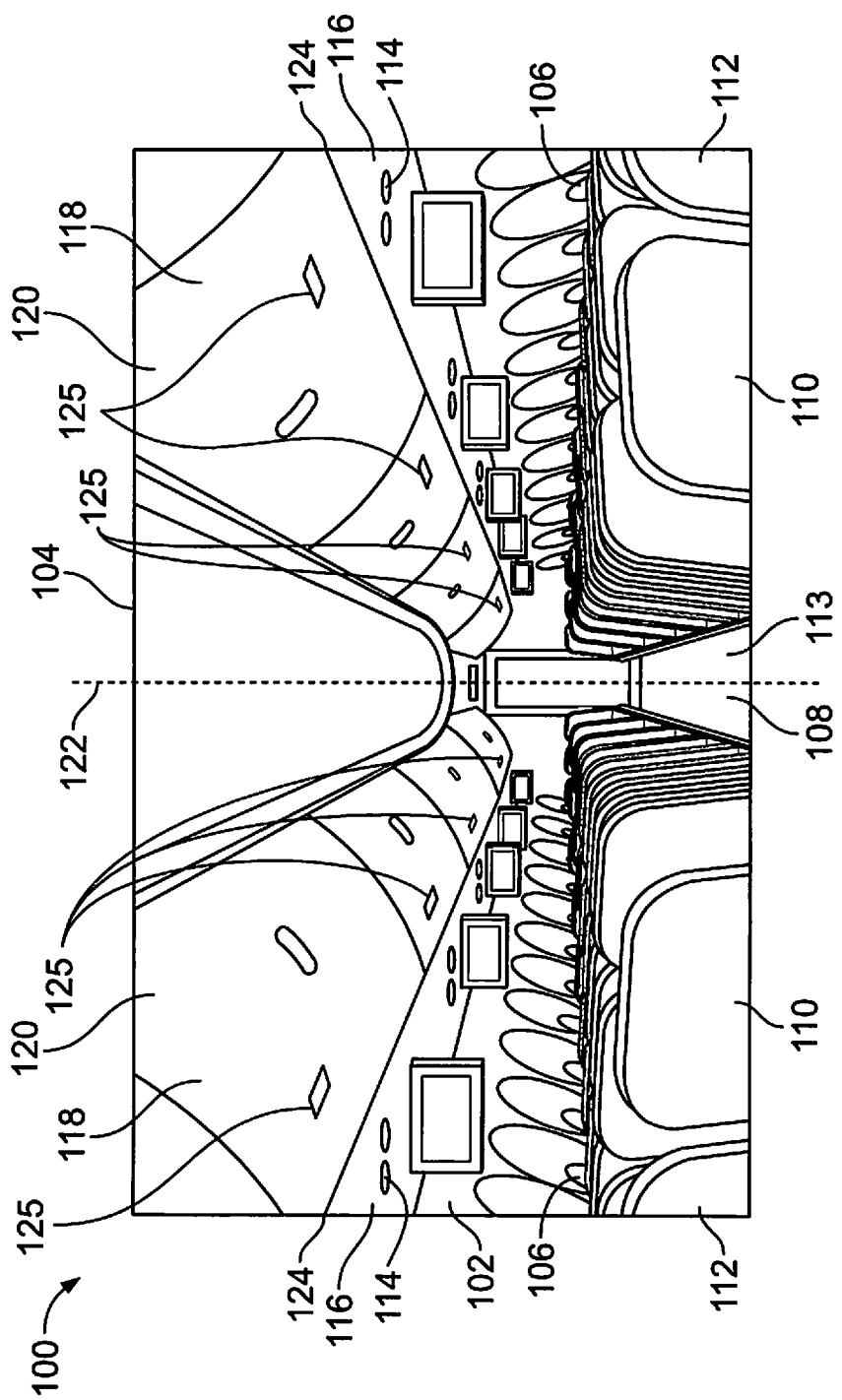
FIG. 3 is a diagrammatic representation of an interior perspective view of an internal cabin of an aircraft, according to an embodiment of the present disclosure.

FIG. 3 is a diagrammatic representation of an interior perspective view of an internal cabin 100 of an aircraft, according to an embodiment of the present disclosure. The internal cabin 100 includes outboard walls 102 connected to a ceiling 104. Windows 106 may be formed within the outboard walls 102. A floor 108 supports rows of seats 110. As shown in FIG. 3, a row 112 may include two seats 110 on either side of an aisle 113. However, the row 112 may include more or less seats 110 than shown. Additionally, the internal cabin 100 may include more aisles than shown.

Passenger service units (PSUs) 114 are secured between an outboard wall 102 and the ceiling 104 on either side of the aisle 113. The PSUs 114 extend between a front end and rear end of the internal cabin 100. For example, a PSU 114 may be positioned over each seat 110 within a row 112. Each PSU 114 may include a housing 116 that generally contains vents, reading lights, an oxygen bag drop panel, an attendant request button, and other such controls over each seat 110 (or groups of seats) within a row 112.

Overhead stowage bin assemblies 118 are secured to the ceiling 104 and/or the outboard wall 102 above and inboard from the PSU 114 on either side of the aisle 113. The overhead stowage bin assemblies 118 are secured over the seats 110. The overhead stowage bin assemblies 118 extend between the front and rear end of the internal cabin 100. Each stowage bin assembly 118 may include a pivot bin or bucket 120 pivotally secured to a strongback (hidden from view in FIG. 3). The overhead stowage bin assemblies 118 may be positioned above and inboard from lower surfaces of the PSUs 114. The overhead stowage bin assemblies 118 are configured to be pivoted open in order to receive passenger carry-on baggage and personal items, for example.

As used herein, the term "outboard" means a position that is further away from a central longitudinal plane 122 of the internal cabin 100 as compared to another component. The term "inboard" means a position that is closer to the central longitudinal plane 122 of the internal cabin 100 as compared to another component. For example, a lower surface of a PSU 114 may be outboard in relation to a stowage bin assembly 118.

A gap 124 may extend along a length of the internal cabin 100 between the PSUs 114 and the stowage bin assemblies 118 on each side of the aisle 113. The gap 124 allows the pivot bins 120 of the stowage bins 118 to be pivoted between open and closed positions.

Electrical devices 125 may be mounted on the buckets 120 of the stowage bin assemblies 118. As shown, the electrical devices 125 may be secured to exterior surfaces of the buckets 120. Optionally, the electrical devices 125 may be secured to interior surfaces of the buckets 120. In at least one embodiment, the electrical devices 125 may be embedded within the buckets 120. The electrical device 125 may be one or more of an electric latch or lock, a speaker, a lighting assembly (such as one or more light emitting diodes), a monitor (such as a video screen and/or touchscreen), a fan, and/or the like.

Figure 4:
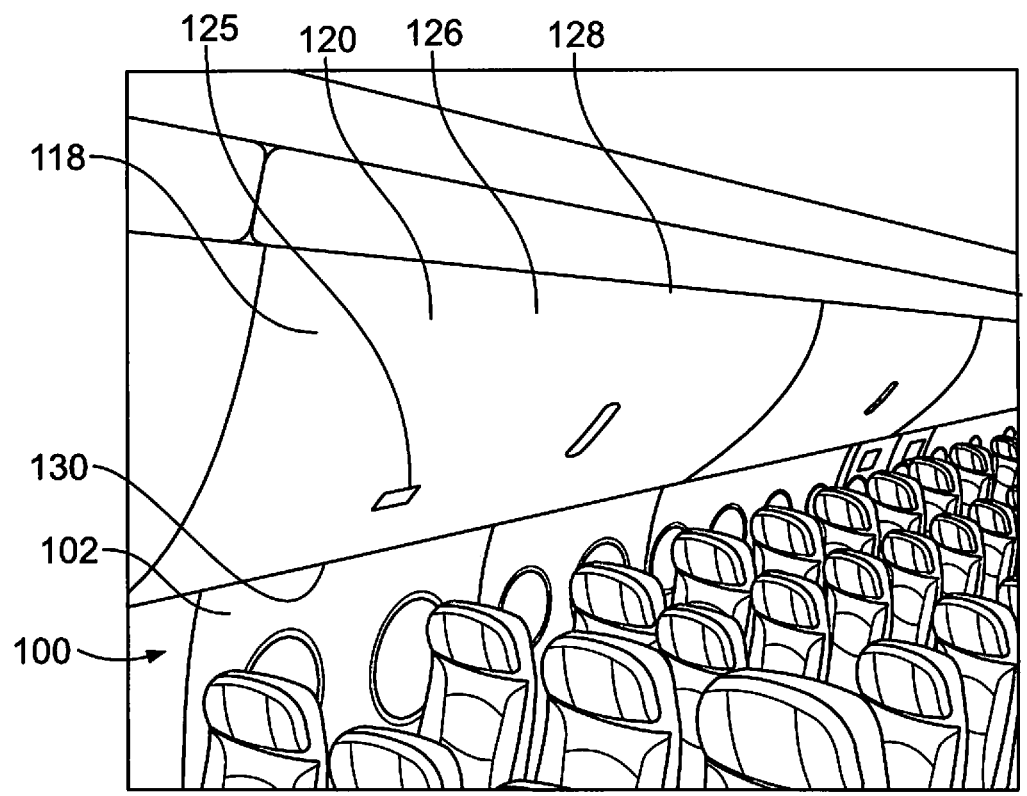
FIG. 4 is a diagrammatic representation of a front perspective view of a stowage bin assembly in a closed position within an internal cabin, according to an embodiment of the present disclosure.

FIG. 4 is a diagrammatic representation of a front perspective view of a stowage bin assembly 118 in a closed position within the internal cabin 100, according to an embodiment of the present disclosure. The stowage bin assembly 118 includes a bucket 120 having a front panel 126 connected to forward and aft end panels (hidden from view in FIG. 4). As shown, the front panel 126 may be an arcuate panel having a curved outer surface that curves downwardly toward the outboard wall 102. As such, a top portion 128 of the front panel 126 is inboard in relation to a lower portion 130. The electrical device 125 may be secured to and/or embedded within the front panel 126.

Figure 5:
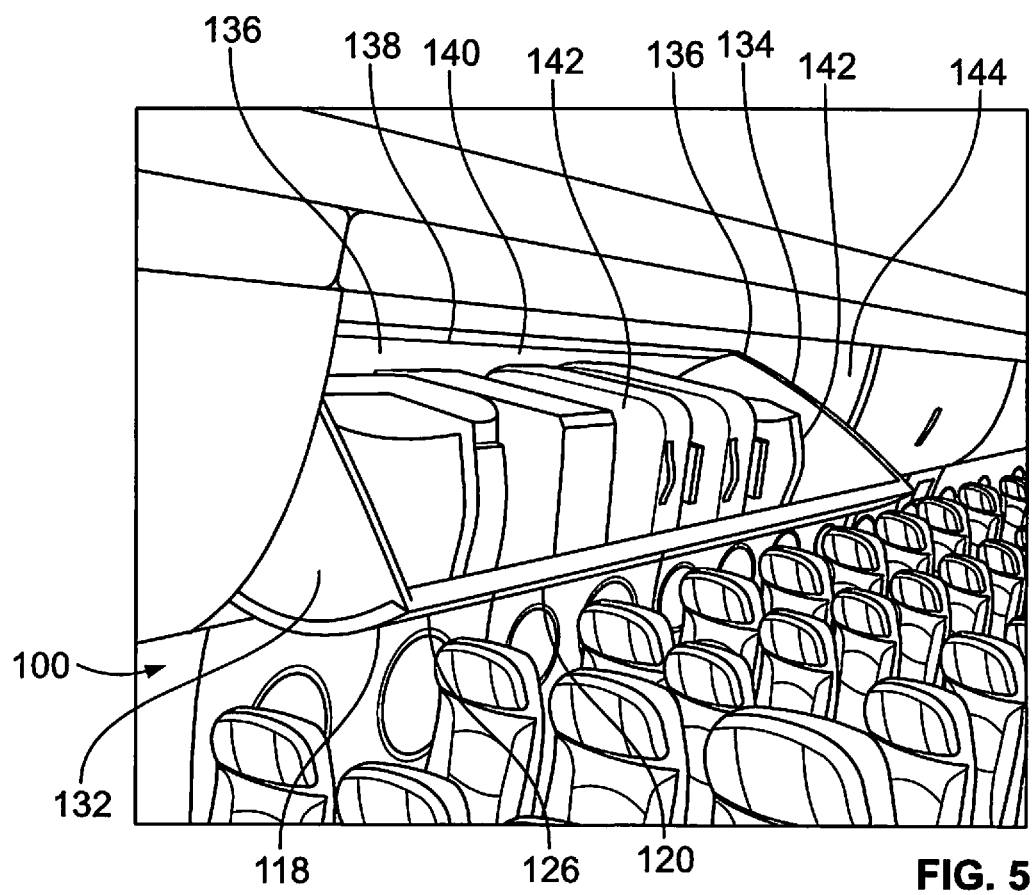
FIG. 5 is a diagrammatic representation of a front perspective view of a stowage bin assembly in an open position within an internal cabin, according to an embodiment of the present disclosure.

FIG. 5 is a diagrammatic representation of a front perspective view of the stowage bin assembly 118 in an open position within the internal cabin 100, according to an embodiment of the present disclosure. As shown, the front panel 126 is secured to a forward end panel 132 and an aft end panel 134, which may generally be opposed and parallel to one another. The front panel 126 and the end panels 132 and 134 may also connect to a bottom panel 136. The bottom panel 136 may be an inwardly curved portion of the front panel 126, for example. A closeout bracket 138 may span between the end panels 132 and 134 and provide a rigid bracing support therebetween. The front panel 126 may be thicker than the end panels 132 and 134, as the front panel 126 is configured to directly support a weight of overhead bags. As such, the front panel 126 may have increased thickness in order to provide additional support strength and rigidity.

A baggage retaining chamber 140 is defined between the front panel 126, the end panels 132 and 134, and the bottom panel 136. The baggage retaining chamber 140 is configured to receive baggage 142 when the stowage bin assembly 118 is in the open position.

The end panels 132 and 134 are each pivotally secured to fixed panels 144, such as fixed panels of a strongback. That is, the fixed panels 144 may be part of a strongback within the internal cabin 100.

Figure 6:
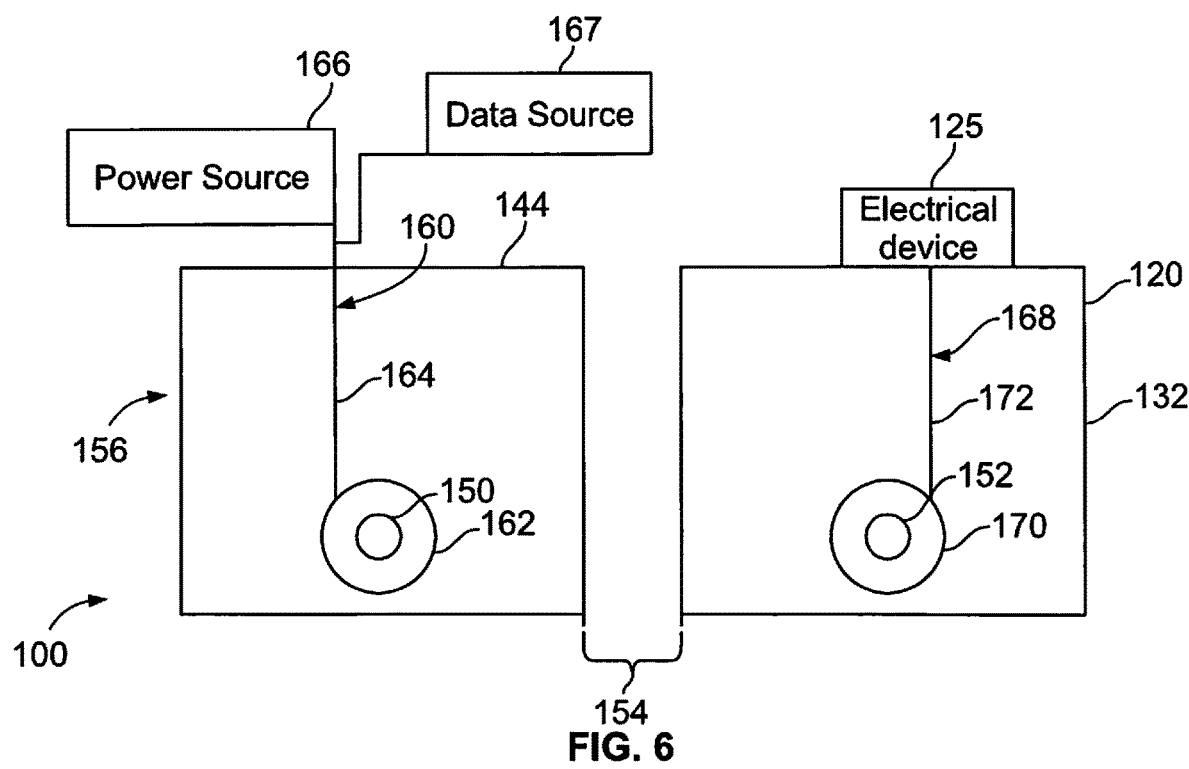
FIG. 6 is a schematic block diagram of a stowage bin assembly, according to an embodiment of the present disclosure.
Figure 11:
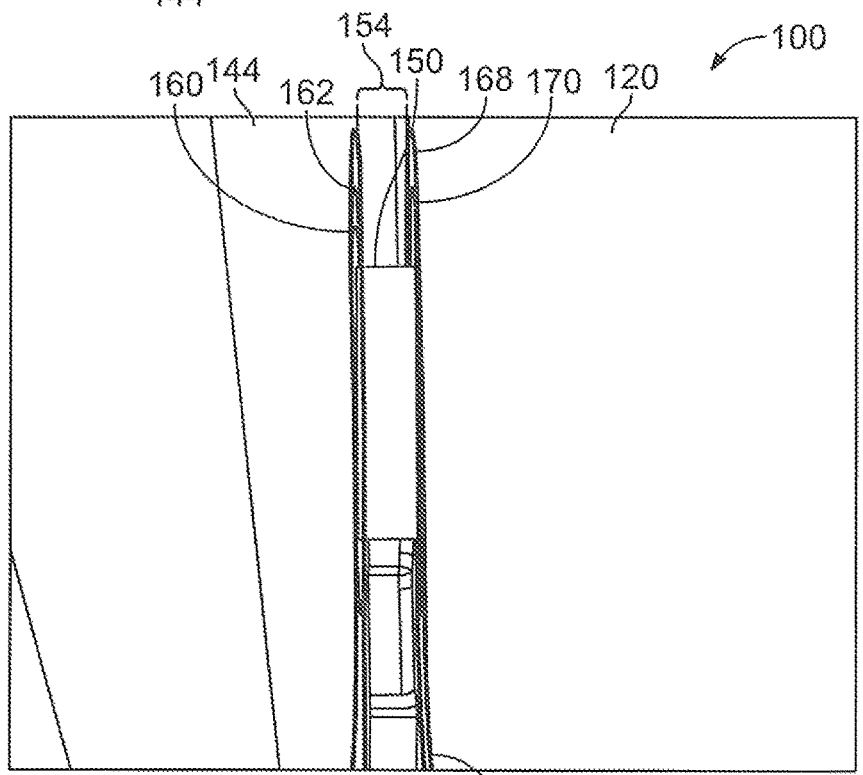
FIG. 11 is a diagrammatic representation of a perspective front view of gap between an end panel of a bucket of a stowage bin assembly and a fixed panel, according to an embodiment of the present disclosure.

FIG. 6 is a schematic block diagram of the stowage bin assembly 118, according to an embodiment of the present disclosure. Note, FIG. 6 illustrates a general overview of the stowage bin assembly 118, and is not drawn to scale. Moreover, for the sake of clarity, the fixed panel 144 and the end panel 132 are shown in an open face manner (as opposed to an actual end-to-end manner, as shown in FIG. 11) in order to clearly show certain components.

FIG. 6 illustrates a system 156 for wirelessly transmitting electrical signals between first and second components of the stowage bin assembly 118 within an internal cabin of a vehicle. For example, the first component may be a strongback, which may include the fixed panel 144, while the second component may be the pivotal bucket 120, which may include the end panels 132 and 134 (only the end panel 132 is shown in FIG. 6), as described above.

In at least one embodiment, the stowage bin assembly 118 includes the fixed panel 144, such as a portion of a strong back, and the bucket 120. An end panel 132 (or 134) pivotally couples to the fixed panel through a pivot interface. The pivot interface includes a pivot pin 150 extending inwardly from the fixed panel 144, and a reciprocal pivot channel 152 that receives the pivot pin 150 on the end panel 132. Optionally, the end panel 132 may include an outwardly-extending pivot pin, while the fixed panel 144 includes a reciprocal pivot channel. When the pivot pin 150 is coupled into the pivot channel 152, the fixed panel 144 is separated from the end panel 132 by a separation gap 154, such as 1-2 millimeters (mm), which may be too small to accommodate standard electrical connectors. Optionally, the gap 154 may be greater or less than 1-2 mm.

A first or transmission circuit 160 is coupled to the fixed panel 144. The transmission circuit 160 may be a tank circuit including at least one capacitor. The transmission circuit 160 includes a first or transmission coil 162 surrounding a cross-sectional circumference of the pivot pin 150. The transmission coil 162 includes one or more conductive coils or windings, which may be formed of copper, for example. The transmission coil 162 is electrically connected to one or more leads 164 (such as electrical traces, wires, or the like) that connect to a power source 166, such as a source of electrical power onboard a vehicle, one or more batteries, and/or the like. Additionally, or alternatively, the transmission coil 162 may be electrically connected to a data source 167 (such as a computer onboard an aircraft) through the leads 164. The transmission coil 162 and the leads 164 may be securely mounted on the fixed panel 144. Optionally, the transmission coil 162 and the leads 164 may be embedded within the fixed panel 144.

The power source 166 generates a first electrical signal as a power signal that is configured to provide power to the electrical device 125. The data source 167 outputs a second electrical signal as a data signal that is configured to control at least one aspect of the electrical device 125. For example, the data signal may control activation/deactivation of the electrical device, intensity (such as illumination intensity of a lighting assembly, volume of a speaker, and/or the like), duration of activation, text, video, or other such graphic messages, and/or the like.

A second or drawing circuit 168 is coupled to the end panel 132 of the bucket 120. The drawing circuit 168 may also be a tank circuit including at least one capacitor. The drawing circuit 168 includes a second or reception coil 170 surrounding a cross-sectional circumference of the pivot channel 152. The reception coil 170 includes one or more conductive coils or windings, which may be formed of copper, for example. The reception coil 170 and the transmission coil 162 may be formed of the same material, and may have the same number of coils or windings. The reception coil 170 is electrically connected to one or more leads 172 (such as electrical traces, wires, or the like) that connect to the electrical device 125. The reception coil 170 and the leads 172 may be securely mounted to the end panel 132. Optionally, the reception coil 170 and the leads 172 may be embedded within the end panel 132.

Alternatively, the transmission coil 162 may be secured to the end panel 132, while the reception coil 168 may be secured to the fixed panel 144. In at least one other embodiment, the transmission coil 162 and/or the reception coil 170 may be secured to various other structures, such as a ceiling or wall panel within an internal cabin. As such, the transmission coil 162 may be secured to a first component, such as a first portion of the stowage bin assembly 100, a ceiling panel, a wall panel, and/or the like, while the reception coil 168 may be secured to a second component, such as a second portion of the stowage bin assembly 100, a ceiling panel, a wall panel, and/or the like. The first and second components are connected together, and may have wall portions that are separated by a gap, such as the gap 154.

When the end panel 132 is pivotally coupled to the fixed panel 144 by way of the pivot pin 150 being pivotally retained within the pivot channel 152, the transmission coil 162 is coaxial with the reception coil 170. The transmission coil 162 and the reception coil 170 may mirror one another. As noted above, both the transmission coil 162 and the reception coil 170 may be formed of the same material, and have the same number of coils or windings. The transmission coil 162 and the reception coil 170 may be identically (or substantially identically) formed.

In operation, in order to supply electrical signals (such as power signals from the power source 166 or data signals from the data source 167) to the electrical device 125, an electrical signal is provided to the transmission coil 162 from the power source 166 via the leads 164. For example, the power source 166 may generate an electrical signal as a power signal that is configured to provide power to the electrical device 125, or the data source 167 may output an electrical signal as a data control signal that is configured to control at least one aspect of the electrical device 125. Because the transmission coil 162 is electrically connected to the power source 166 and/or the data source 167 (such as via the leads 164), the electrical signals generated by the power source 166 and/or the data source 167 are directly received by the transmission coil 162.

As an electrical signal is provided to the transmission coil 162 by the power source 166 and/or the data source 167, the transmission coil 162 resonates at a particular frequency, and generates a magnetic field. While the reception coil 170 is separated from the transmission coil 162 by the gap 154 (that is, the reception coil 170 is not directly mechanically coupled to the transmission coil 162), the reception coil 170 is within the magnetic field generated by the transmission coil 162. As the reception coil 170 is subjected to the generated magnetic field, the electrical signal is induced in the reception coil 170 (for example, the reception coil 170 converts the generated magnetic field into a corresponding electrical signal). The induced electrical signal is then supplied to the electrical device 125 via the leads 168.

The electrical signal is efficiently and optimally transmitted to the reception coil 170 through the resonance of the transmission coil 162 because the transmission coil 162 and the reception coil 170 may be identically formed and axially aligned with one another (and therefore resonate at the same or similar frequencies). Alternatively, the reception coil 170 may differ from the reception coil 170 with respect to the number of coils or windings, material, and/or the like; although differences therebetween may affect the efficiency of signal transmission and reception.

Figure 7:
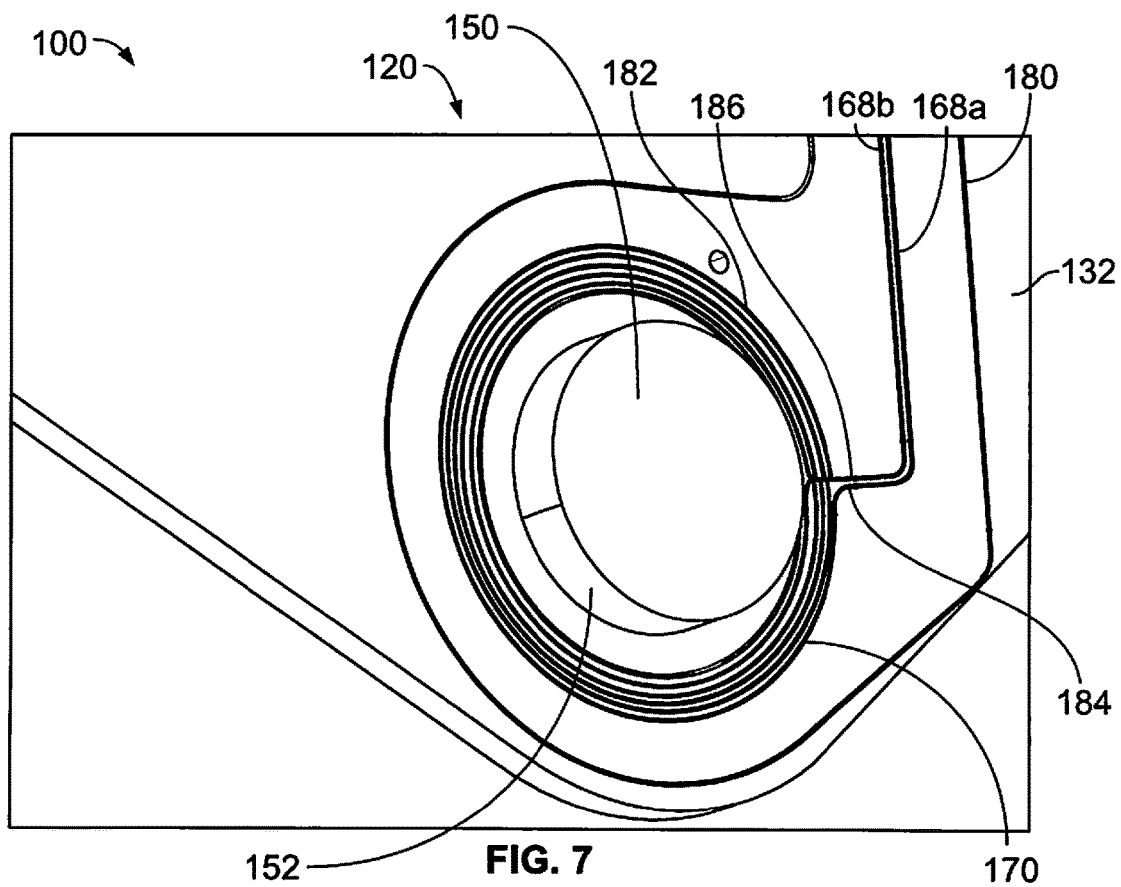
FIG. 7 is a diagrammatic representation of an interior perspective view of an end panel of a bucket of a stowage bin assembly, according to an embodiment of the present disclosure.

FIG. 7 is a diagrammatic representation of an interior perspective view of the end panel 132 of the bucket of the stowage bin assembly 100, according to an embodiment of the present disclosure. The pivot pin 150 of the fixed panel 144 (shown in FIG. 6) is pivotally retained within the pivot channel 152 formed through the end panel 132 of the bucket 120.

The reception coil 170 and the leads 168a and 168b may be mounted on a substrate 180, such as a circuit board, paper, a surface of the end panel 132, and/or the like. Optionally, the reception coil 170 and the leads 168 may be embedded within the end panel 132.

The reception coil 170 has a plurality of windings 182. As shown, the reception coil 170 may have five windings that surround an outer circumference of the pivot channel 152. Optionally, the reception coil 170 may include more or less windings 182 than shown. One end 184 of the reception coil 170 connects to a lead 168a, while an opposite end 186 of the reception coil 170 connects to a lead 168b.

The reception coil 170 is positioned around the pivot pin 150 and the pivot channel 152, but may be separated therefrom. That is, the reception coil 170 may be routed around and separated from the pivot pin 150 and the pivot channel 152 so as not to interfere with pivotal motion of the bucket 120 relative to the fixed panel 144 (shown in FIG. 6).

Figure 8:
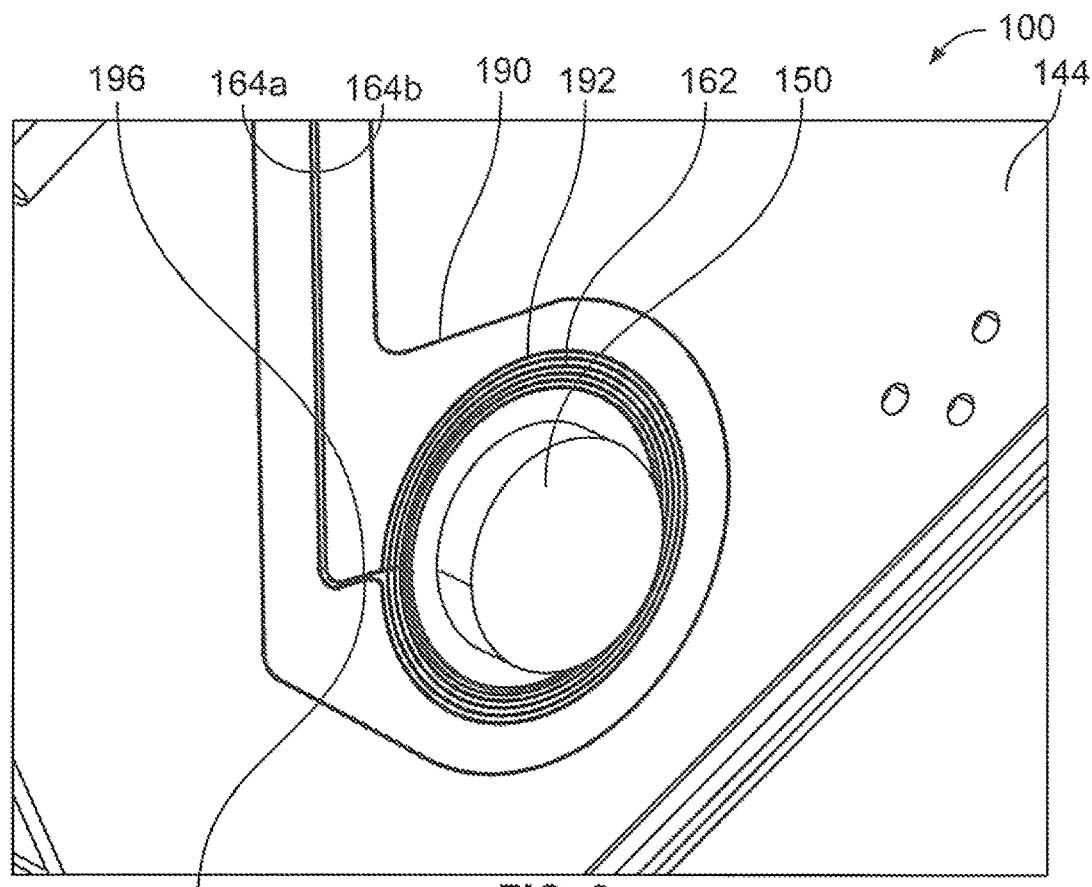
FIG. 8 is a diagrammatic representation of an interior perspective view of a fixed panel of a stowage bin assembly, according to an embodiment of the present disclosure.

FIG. 8 is a diagrammatic representation of an interior perspective view of the fixed panel 144 of the stowage bin assembly 100, according to an embodiment of the present disclosure. The pivot pin 150 inwardly extends from the fixed panel 144.

The transmission coil 162 and the leads 164a and 164b may be mounted on a substrate 190, such as a circuit board, paper, a surface of the fixed panel 144, and/or the like. Optionally, the transmission coil 162 and the leads 164a and 164b may be embedded within the fixed panel 144.

The transmission coil 162 has a plurality of windings 192. As shown, the transmission coil 162 may have five windings that surround an outer circumference of the pivot pin 150. Optionally, the transmission coil 162 may include more or less windings 192 than shown. One end 194 of the transmission coil 162 connects to a lead 164a, while an opposite end 196 of the transmission coil 162 connects to a lead 164b.

The transmission coil 162 is positioned around the pivot pin 150, but may be separated therefrom. That is, the transmission coil 162 may be routed around and separated from the pivot pin 150 so as not to interfere with pivotal motion of the bucket 120 (shown in FIGS. 6 and 7) relative to the fixed panel 144.

Figure 9:
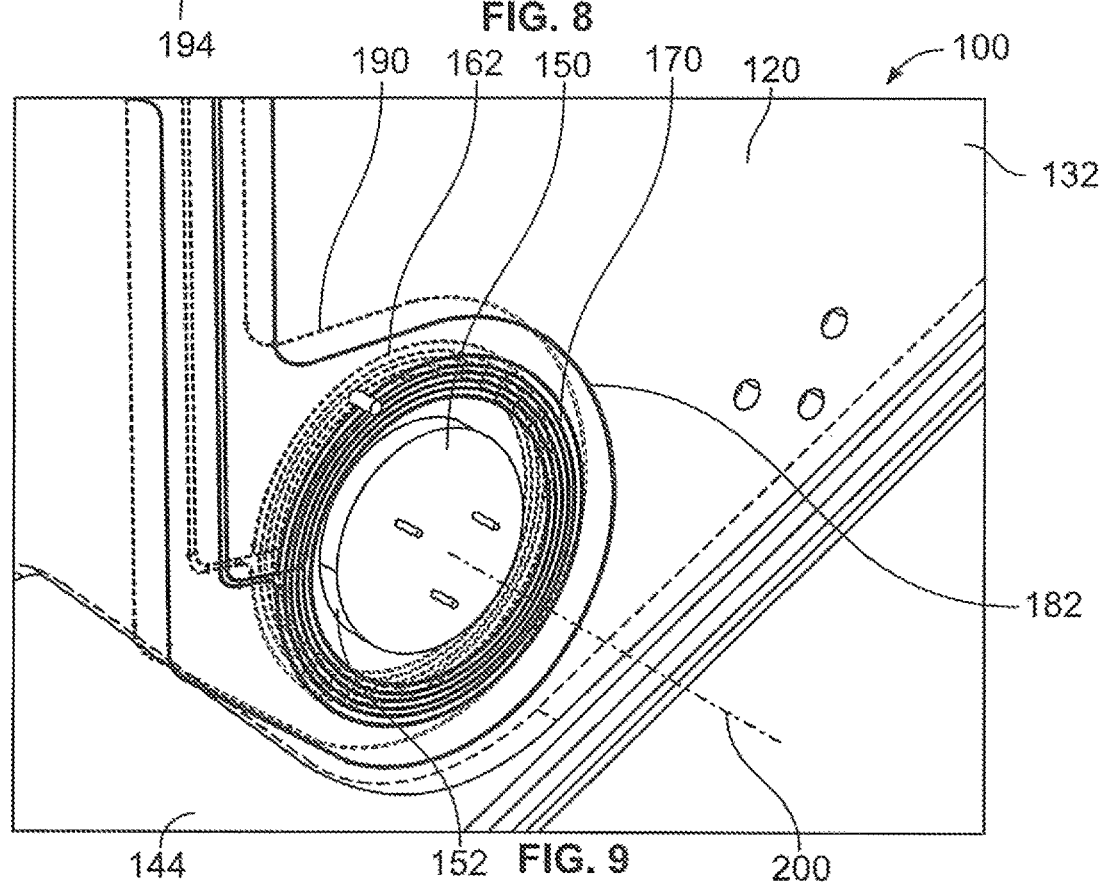
FIG. 9 is a diagrammatic representation of an interior perspective view of an end panel of a bucket of a stowage bin assembly pivotally coupled to a fixed panel, according to an embodiment of the present disclosure.
Figure 10:
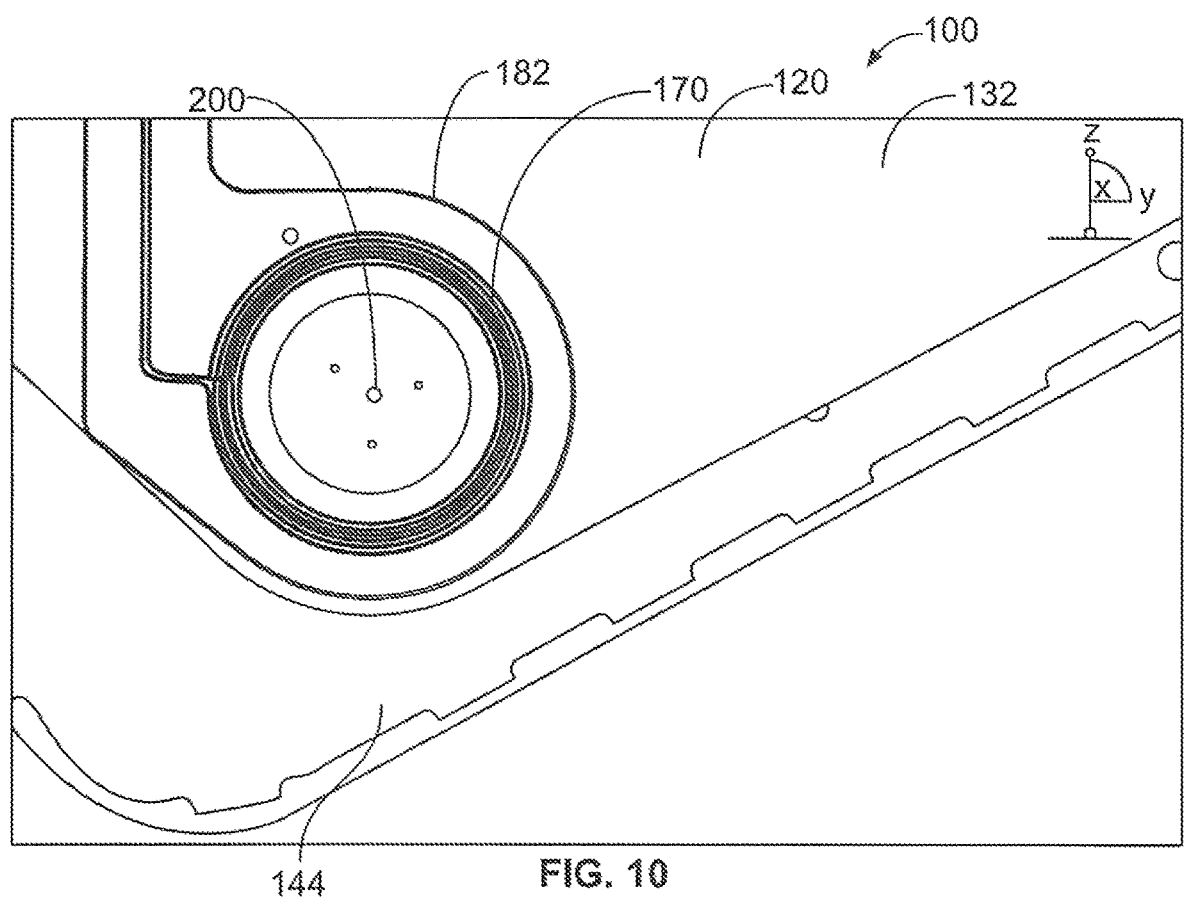
FIG. 10 is a diagrammatic representation of an interior lateral view of an end panel of a bucket of a stowage bin assembly pivotally coupled to a fixed panel, according to an embodiment of the present disclosure.

FIG. 9 is a diagrammatic representation of an interior perspective view of the end panel 132 of the bucket 120 pivotally coupled to the fixed panel 144, according to an embodiment of the present disclosure. FIG. 10 is a diagrammatic representation of an interior lateral view of the end panel 132 of the bucket 120 pivotally coupled to the fixed panel 144. Referring to FIGS. 9 and 10, when the end panel 132 is pivotally coupled to the fixed panel 144, the transmission coil 162 and the reception coil 170 are coaxial (that is, both share the same longitudinal axis 200). In particular, the transmission coil 162 and the reception coil 170 are coaxially aligned with respect to the longitudinal axis 200 of the pivot pin 150. Because the transmission coil 162 and the reception coil 170 mirror one another, when the bucket 120 rotates with respect to the fixed panel 144 about the pivot interface between the pivot pin 150 and the pivot channel 152, the transmission coil 162 and the reception coil 170 remain axially aligned (in that outer and inner windings of the coils 162 and 170 do not axially shift with respect to one another). Through an entire range of pivotal motion of the bucket 120 with respect to the fixed panel 144, the transmission coil 162 and the reception coil 170 remain axially in line with another, thereby allowing for efficient transmission of electrical signals (such as power and/or data signal) therebetween. Stated differently, as the bucket 120 pivots through a range of motion with respect to the fixed panel 144, the transmission coil 162 remains axially aligned with respect to the reception coil 170, thereby maintaining a stable and robust electrical coupling therebetween.

As shown and described, electrical signals may be transmitted between the transmission coil 162 and the reception coil 170 without the use of a mechanical plug and receptacle. As such, the assembly and installation process is streamlined, as separate and distinct connections between the bucket 120 and the fixed panel 144 are not necessary. Further, the stowage bin assembly 100 is made lighter, in that additional wires and connectors are not used.

Each of the coils 162 and 170 may include or be coupled to one or more radio frequency identification (RFID) chips, windings, or the like. The RFID chips or coils 162 and 170 allow for electrical signals in the form of data signals to be transferred between the coils 162 and 170.

FIG. 11 is a diagrammatic representation of a perspective front view of the gap 154 between the end panel 132 of the bucket 120 and the fixed panel 144, according to an embodiment of the present disclosure. The transmission coil 162 is axially aligned with the reception coil 170, but both are separated from one another by the gap 154, which may be 1-2 mm. Optionally, the gap 154 may be greater or less than 1-2 mm. As shown, no wiring or connector extends into the gap 154. The circuits 160 and 168 provide an electrical coupling therebetween, and may be positioned in tight spaces (such as within the gap 154) that may be too small to accommodate conventional wires and connectors.

Figure 12:
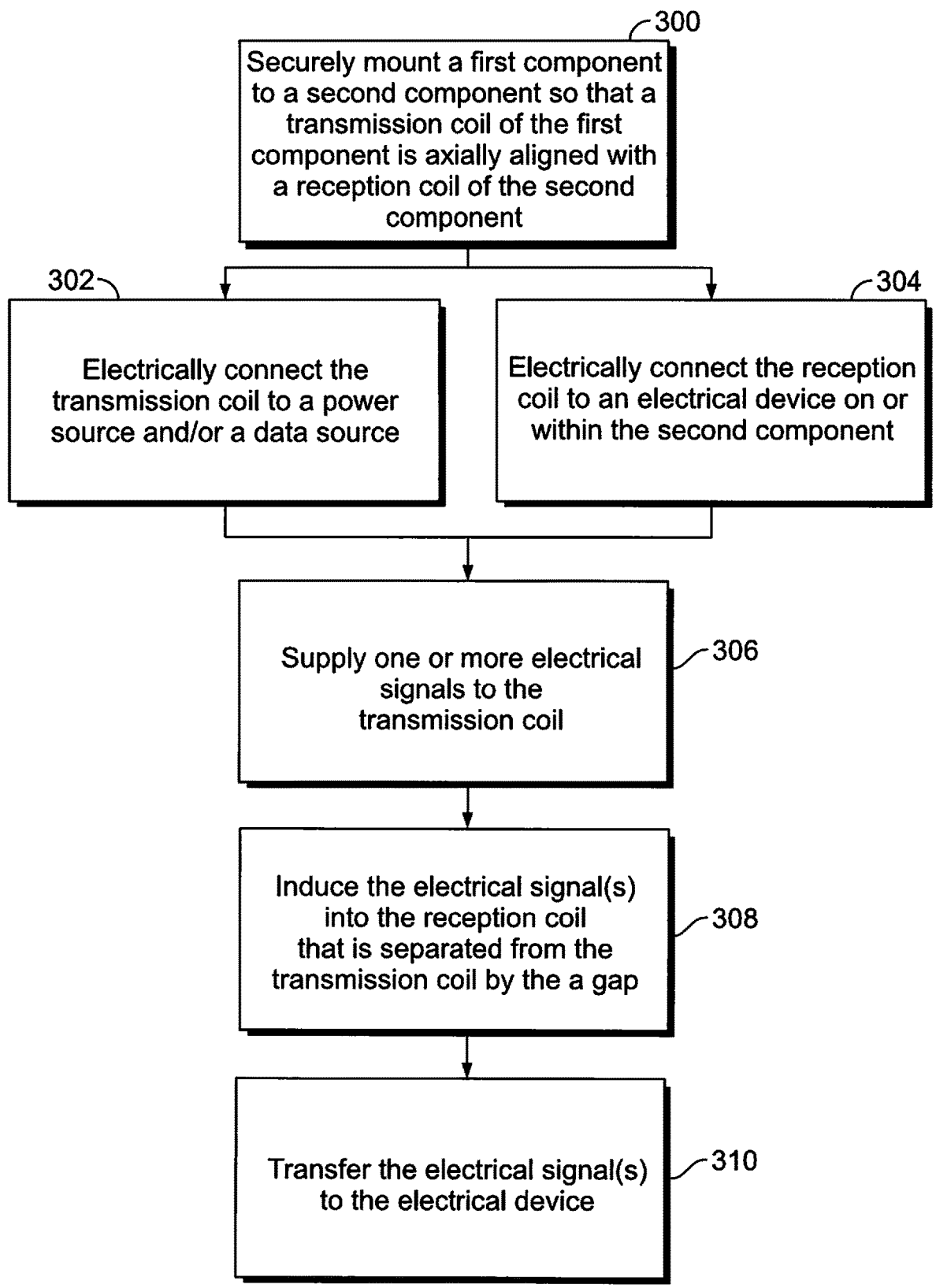
FIG. 12 illustrates a flow chart of a method of wirelessly transmitting electrical signals from a first component to a second component, according to an embodiment of the present disclosure.

FIG. 12 illustrates a flow chart of a method of wirelessly transmitting electrical signals from a first component to a second component, according to an embodiment of the present disclosure. The first component may be a first portion of an overhead stowage bin assembly, such as a fixed panel of a strongback, while the second component may be a second portion of the overhead stowage bin assembly, such as a pivot bucket that is pivotally coupled to the fixed panel. In at least one other embodiment, the first and/or second components may be or include a portion of a stowage bin assembly, a wall panel, a ceiling panel, a monument (such as galley station, or a lavatory), or the like within an internal cabin of a vehicle.

The method begins at 300, at which the first component is securely mounted to the second component so that a transmission coil of the first component is axially aligned with a reception coil of the second component. At 302, the transmission coil is electrically connected to a power source and/or a data source. At 304, the reception coil is electrically connected to an electrical device on or within the second component. 302 and 304 may occur at the same time and/or overlap in time. Optionally, 302 may occur before 304, or vice versa.

At 306, one or more electrical signals are supplied to the transmission coil via the power source and/or the data source. The electrical signals may be power signals (as supplied from the power source) and/or data signals (as supplied from a data source, such as a computer onboard a vehicle). The power source 166 (shown in FIG. 6) generates a first electrical signal as a power signal that is configured to provide power to the electrical device 125 (shown in FIG. 6). The data source 167 (such as a computer) outputs a second electrical signal as a data signal that is configured to control at least one aspect of the electrical device 125. For example, the data signal may control activation/deactivation of the electrical device, intensity (such as illumination intensity of a lighting assembly, volume of a speaker, and/or the like), duration of activation, and/or the like.

The electrical signals supplied to the transmission coil cause it to resonate and generate a magnetic field. The reception coil, which is separated from the transmission coil by a gap, is nevertheless within the generated magnetic field, and, as such, at 308 the electrical signal is induced in the reception coil (for example, converting the generated magnetic field into the electrical signal(s)). At 310, the induced electrical signal(s) in the reception coil is then transferred to the electrical device, thereby powering the electrical device, and/or supplying data (for example, control data) thereto.

Referring to FIGS. 1-12, embodiments of the present disclosure provide systems and methods for transferring electrical signals (such as power signals and/or data signals) between two components, such as portions of an overhead stowage bin assembly, ceiling panels, wall panels, and/or the like. Embodiments of the present disclosure are ideally suited for areas in which space is confined or otherwise limited. The gap 154 between the components may be varied depending on applied voltage, current, electronic components (for example, resistors and capacitors) within the circuits 160 and 168, and/or through variations in the coils 162 and 170 (such as different wire gage, number of windings, coil size, shape, and/or the like).

As described above, embodiments of the present disclosure provide efficient systems and methods for transferring electrical signals between a first component, such as a strongback, and a second component, such as a moveable bucket, of an overhead stowage bin assembly. Embodiments of the present disclosure provide compact and effective systems and methods for electrically coupling components of an overhead stowage bin assembly together.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle comprising:
   an internal cabin; and
   a system for wirelessly transmitting electrical signals between a strongback of an overhead stowage bin assembly and a bucket that is pivotally coupled to the strongback within the internal cabin, wherein the system comprises:
   a first circuit including a first coil secured to the strongback, wherein the first coil is electrically connected to one or both of a power source or a data source onboard the vehicle; and
   a second circuit including a second coil secured to the bucket, wherein the second coil is electrically connected to an electrical device secured to the bucket, wherein the first circuit is separated from the second circuit by a gap, wherein the first coil is configured to receive one or more electrical signals from one or both of the power source or the data source, and wherein the one or more electrical signals are induced in the second coil by the first coil and transmitted to the electrical device.

2. The vehicle of claim 1, wherein the bucket is pivotally coupled to the strongback at a pivot interface, wherein the first and second coils are positioned around a circumference of at least a portion of the pivot interface.

3. The vehicle of claim 2, wherein the pivot interface pivotally couples a fixed panel of the strongback to an end panel of the bucket.

4. The vehicle of claim 1, wherein the power source generates a first electrical signal as a power signal that is configured to provide power to the electrical device, and wherein the data source outputs a second electrical signal as a data signal that is configured to control at least one aspect of the electrical device.

5. The vehicle of claim 1, wherein the first circuit includes one or more first leads that electrically connect the first coil to one or both of the power source or the data source, and wherein the second circuit includes one or more second leads that electrically connect the second coil to the electrical device.

6. The vehicle of claim 1, wherein the first coil mirrors the second coil.

7. The vehicle of claim 1, wherein the first coil is coaxial with the second coil.

8. The vehicle of claim 1, wherein the first coil is embedded within the strongback, and wherein the second coil is embedded within the bucket.

9. A method of wirelessly transmitting electrical signals between a strongback of an overhead stowage bin assembly and a within an internal cabin of a vehicle, the method comprising:
securing a first coil of a first circuit to the strongback;
electrically connecting the first coil to one or both of a power source or a data source onboard the vehicle;
securing a second coil of a second circuit to the bucket;
electrically connecting the second coil to an electrical device secured to the bucket;
connecting the strongback to the bucket, wherein the connecting includes separating the first circuit from the second circuit by a gap;
generating one or more electrical signals with one or both of the power source or the data source;
receiving the one or more electrical signals generated by the one or both of the power source or the data source at the first coil;
inducing the one or more electrical signals in the second coil due to the receiving; and
transmitting the one or more electrical signals induced in the second coil to the electrical device.

10. The method of claim 9, further comprising:
pivotally coupling the bucket to the strongback at a pivot interface; and
positioning the first and second coils around a circumference of at least a portion of the pivot interface.

11. The method of claim 9, wherein the generating comprises:
using the power source to generate a first electrical signal as a power signal that is configured to provide power to the electrical device; and
using the data source to output a second electrical signal as a data signal that is configured to control at least one aspect of the electrical device.

12. The method of claim 9, wherein the connecting the strongback to the bucket comprises mirroring the first coil with the second coil.

13. The method of claim 9, wherein the connecting the strongback to the bucket comprises coaxially coupling the first coil to the second coil.

14. The method of claim 9, wherein the securing the first coil comprises embedding the first coil within the strongback, and wherein the securing the second coil comprises embedding the second coil within the bucket.

15. An overhead stowage bin assembly configured to be positioned within an internal cabin of a vehicle, the overhead stowage bin assembly comprising:
a strongback;
a first circuit including a first coil embedded within the strongback and one or more first leads that electrically connect the first coil to one or both of a power source or a data source onboard the vehicle;
a bucket pivotally secured to the strong back, wherein the bucket is pivotally coupled to the strongback at a pivot interface; and
a second circuit including a second coil embedded within the bucket and one or more second leads that electrically connect the second coil to an electrical device secured to the bucket, wherein the first circuit is separated from the second circuit by a gap, wherein the first coil mirrors and is coaxial with the second coil, wherein the first and second coils are positioned around a circumference of at least a portion of the pivot interface, wherein the first coil is configured to receive one or more electrical signals from one or both of the power source or the data source, and wherein the one or more electrical signals are induced in the second coil by the first coil and transmitted to the electrical device.

16. The overhead stowage bin assembly of claim 15, wherein the pivot interface pivotally couples a fixed panel of the strongback to an end panel of the bucket.

17. The overhead stowage bin assembly of claim 15, wherein the power source generates a first electrical signal as a power signal that is configured to provide power to the electrical device, and wherein the data source outputs a second electrical signal as a data signal that is configured to control at least one aspect of the electrical device.

18. The overhead stowage bin assembly of claim 15, wherein the electrical device comprises one or more of an electric latch, an electric lock, a speaker, a lighting assembly, monitor, or a fan.

19. The vehicle of claim 1, wherein the electrical device comprises an electric latch, an electric lock, a speaker, a lighting assembly, a monitor, or a fan.

20. The method of claim 9, wherein the electrical device comprises an electric latch, an electric lock, a speaker, a lighting assembly, a monitor, or a fan.

* * * * *